United States Patent [19]

März et al.

[11] 4,394,980
[45] Jul. 26, 1983

[54] DEVICE FOR THE SIMULTANEOUS AND CONTINUOUS FEEDING OF PULVERULENT SOLIDS AND OF LIQUIDS INTO TREATMENT MACHINES

[75] Inventors: Dieter März, Mannheim; Philipp Schmitt, Lampertheim; Peter Weidenhammer, Mannheim, all of Fed. Rep. of Germany

[73] Assignee: Draiswerke GmbH, Mannheim, Fed. Rep. of Germany

[21] Appl. No.: 261,245

[22] Filed: May 6, 1981

[30] Foreign Application Priority Data

May 16, 1980 [DE] Fed. Rep. of Germany ....... 3018729

[51] Int. Cl.³ ............................................. B02C 23/36
[52] U.S. Cl. .................................... 241/46.02; 241/62
[58] Field of Search ................... 241/39, 46.02, 46.17, 241/46.11, 171, 172, 62

[56] References Cited

U.S. PATENT DOCUMENTS

| | | | |
|---|---|---|---|
| 3,462,086 | 8/1969 | Bertrand et al. | 241/39 X |
| 3,840,188 | 10/1974 | Coombe et al. | 241/5 X |
| 3,856,215 | 12/1974 | Van Vliet | 241/39 |
| 3,957,210 | 5/1976 | Dürr. | |

FOREIGN PATENT DOCUMENTS 2631622 11/1977 Fed. Rep. of Germany.

*Primary Examiner*—Mark Rosenbaum

*Attorney, Agent, or Firm*—Browdy & Neimark

[57] ABSTRACT

A device for the simultaneous continuous feeding of pulverulent solids and of liquids into a treatment machine wherein the casing of the machine is provided with an orifice for feeding in liquids and solids. A feed branch extends upwardly from this orifice and leads into a ring passage. Positioned on the inner wall of the feed branch is an orifice for feeding liquids to the treatment machine and located in the center of the ring passage is a device for feeding solids to the treatment machine. The free cross-sectional size and shape of the orifice is adjustable and may be varied, in a simple manner, by modifications to the structures of the ring passage and orifices. In the cylindrical section of the feed branch several annular rows of bores, having differing diameters in each of the rows, form an orifice for the liquid feed. The bores within one row are arranged offset tangentially relatively to the direction of the adjacent bores in the other rows. The orifice may also comprise axially extending slots which are formed in the cylindrical section and which widen toward the base of the slots in the shape of a wedge. In another embodiment, an adjustable annular gap is provided between the upper and lower sections of the feed branch by means of a threaded connection provided between the upper and lower section parts. A clamping screw is provided to maintain any selected adjustment of the gap unchanged during any desired period of use of the treatment machine.

10 Claims, 4 Drawing Figures

DEVICE FOR THE SIMULTANEOUS AND CONTINUOUS FEEDING OF PULVERULENT SOLIDS AND OF LIQUIDS INTO TREATMENT MACHINES

FIELD OF THE INVENTION

The invention relates to a device for the simultaneous and continuous feeding of pulverulent solids and of liquids into various machines for further treatment.

In many cases, it is necessary for technological reasons to introduce solids and liquids simultaneously and continuously into various treatment machines, such as mixers, feed screws for stirred ball mills, feed screws for screw extruders, or mills. In these cases, there is the general problem of introducing solids and liquids into the particular treatment machine, without caking of the solids occurring in the feed branches.

BACKGROUND OF THE INVENTION

To solve these problems, German Offenlegungsschrift No. 26 31 622.3 has proposed that the liquid be fed into a treatment machine in the form of a tubular envelope, the solids being introduced into the center thereof. This tubular liquid envelope which runs down, in the form of a liquid film, on the inner wall of the feed branch surrounds the solids stream, which is to be introduced into the treatment machine, and, due to its direction of flow, prevents the solids from penetrating this envelope transversely to its direction of flow. This solution according to the German Application has proved extremely successful in practice.

OBJECTS AND SUMMARY OF THE INVENTION

It is now the object of the invention further to develop this above-described prior art in such manner that the liquid film, moving down the inner wall of the feed branch, is formed in as uniform a thickness as possible over its entire periphery.

This object is achieved by providing an orifice on the casing of a treatment machine for feeding liquids and solids into the machine. A feed branch extends upwardly from the orifice and is connected to a ring passage. An orifice for feeding liquids is located on the inner wall of the feed branch while a device for feeding solids is located in the center of the ring passage, the free cross-sectional shape and size of the orifices being adjustable. In this way, it is ensured that, even if the quantity of liquid fed per unit time changes, where is always a liquid film, which is uniformly unbroken over the entire periphery of the inner wall of the feed branch, running down on the inner wall, instead of individual, mutually separate streams of liquid.

The cross-sectional shape and size of the orifices, described above, can be varied in a simple manner by modifications to the structure of the ring passage and orifices referred to above.

In another embodiment of the invention, an annular gap extending around the the periphery is provided between the upper and lower sections of the feed branch, the width of this gap being adjustable.

BRIEF DESCRIPTION OF THE DRAWING

Further advantages and features of the invention can be seen from the description of illustrative embodiments, by reference to the drawing in which.

DETAILED DESCRIPTION OF PREFERRED EMBODIMENTS

Figure 1:
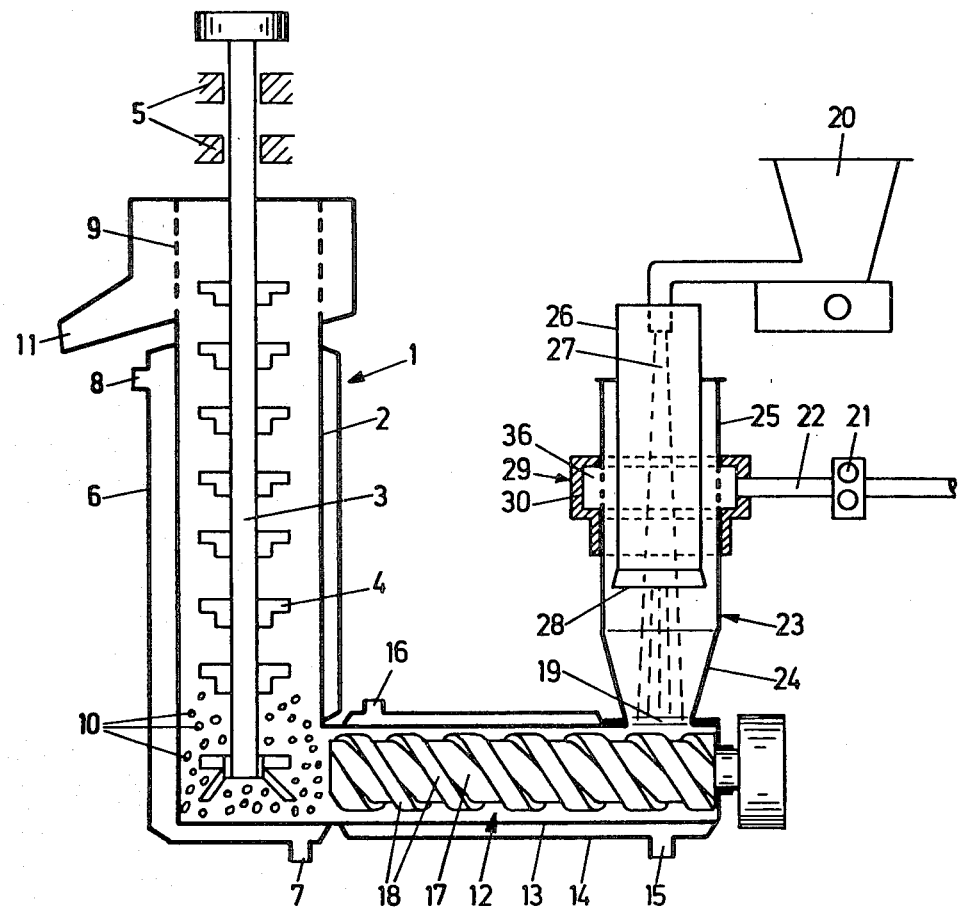
FIG. 1 shows a feed screw of a stirred ball mill, provided with a device, constructed according to the invention, arranged upstream of the feed screw.

A stirred ball mill 1 consists of a cylindrical milling vessel 2, in which there is a concentrically arranged stirrer shaft 3, which is provided with stirring tools 4. The stirrer shaft 3, supported in a floating mount in bearings 5 above the milling vessel 2, can be driven at a high speed by a drive which is not shown. The milling vessel 2 is surrounded by a cooling jacket 6 connected to a lower coolant inlet 7 and an upper coolant outlet 8. At the upper end of the milling vessel, a separation device 9, for example a screen, is provided through which the milling charge can leave, through an outlet 11, after fine milling and dispersing. Auxiliary milling bodies 10 are retained in the milling vessel 2.

At the lower end of the ball mill, one form of a treatment machine is provided. This machine comprises a feed screw 12, the casing 13, of which, is surrounded by a double jacket 14, which has an inlet orifice 15 and an outlet orifice 16. These orifices provide respectively, for the feed and discharge of a liquid medium for cooling or heating, which liquid medium leads into the spaces of milling vessel 2. In the casing, a screw shaft 17 is located which is provided with screw windings 18 the mounting and drive of the screw shaft are not shown. The casing 13 connects to a feed orifice 19, upstream of which, a metering device 20, for free-flowing solids, and a liquid-metering device 21, with a liquid feed line 22, are provided. A stirred ball mill 1, of this type, with an upstream feed screw 12 is known from German Offenlegungsschrift No. 2,432,860 (U.S. Pat. No. 3,957,210, British Patent Specification No. 1,431,620 and Japan Sho-No. 50-12,263).

The feed orifice 19 is surrounded by an upward-extending feed branch 23, which consists of a lower funnel-shaped section 24, which is flanged to the casing 13 at the feed orifice 19 and widens towards the top. The feed branch also comprises an upper section 25, which is approximately cylindrical.

A pipe-like or funnel-like solids-feeding device 26 projects concentrically into the upper cylindrical section 25 of the feed branch 23, the free-flowing solids being introduced into the feeding device by the metering device 20 and passing, as an unbroken solids stream 27, into the feed orifice 19. A little above the lower exit orifice 28 of the device 26, a ring passage 29 is formed which surrounds the cylindrical section 25. In the illustrative embodiment, according to FIGS. 1 to 3, the ring passage is formed by a ring-shaped shell 30, the cross-section of which is approximately C-shaped and the legs 31, 32, of which, are sealed by means of ring gaskets 33, 34 against the outer wall 35 of the section 25. The annular space 36, thus delimited, of the ring passage 29 is connected to the liquid-feed line 22. In the wall of the cylindrical section 25 of the feed branch 23, several annular arrangements of bores, 37, 38 and 39, are provided one above the other and, in the position shown in FIG. 2, all these are connected to the annular space 36 of the ring passage 29. The shell 30, which delimits the ring passage 29, is displaceable on the outer wall 35 of the cylindrical section 25 so that one or more rows, or even all of the rows of bores 37, 38 and 39 can be closed by the lower leg 32 of the shell 30. The axial extension "a" of the annular space 36, which is the extent of this annular space in the direction of the common longitudinal center axis 40, is greater than the greatest axial distance "b" of the bores 37 and 39. Finally, the axial distance covering the bores 39, 38 and 37, from the annular space 36, which is the surface area of the leg 32, which is suitable for covering the bores 37, 38 and 39, is somewhat greater than the axial distance "b".

Within each annular arrangement of a bore 37, 38, or 39, the bores have the same diameter, but the diameters of the bores 37, 38 and 39 differ from one another. As can be seen from FIG. 2, the diameter of the bores increases towards the leg 32. When the shell 30, forming the ring passage 29, is displaced upwards from the position shown in FIG. 2, the lower rows of bores 39, of the largest diameter, is closed first, and subsequently the middle row of bores 38, of medium diameter, is closed. Finally, the upper row of bores 37, of the smallest diameter, is then also closed. In this way, the total cross-section of all the bores, 37, 38 and 39, can be virtually infinitely varied from its maximum down to zero. To ensure reliable functioning of the closure of the bores 39, 38 and 37 by means of the leg 32 of the shell 30, the latter is guided virtually without clearance on the outer wall 35 of the section 25.

Liquid, which has been metered by the liquid-metering device 21 and fed in via the liquid-feed line 22, flows from the ring space 36 through the bores 37, 38 and 39, or only through the bores 37 and 38, or only through the bore 37, into the feed branch 23. The liquid then flows off downwards on the inner wall 41 thereof to the feed orifice 19 of the feed screw 12 which is part of a treatment machine. During this tme, the solids stream 27 is completely enveloped by the liquid film 42, which is running down on the inner wall 41.

Figure 2:
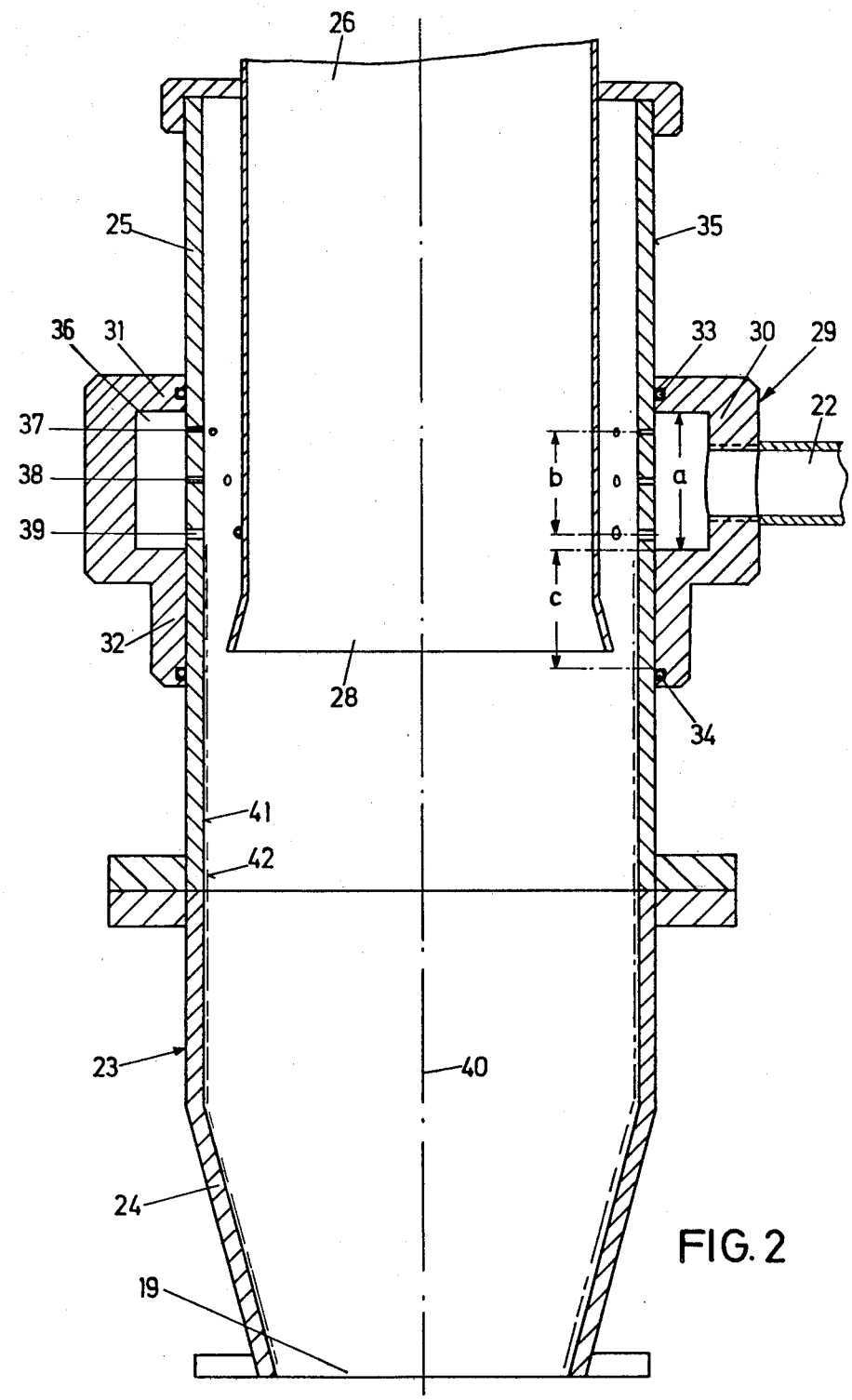
FIG. 2 shows an enlarged representation of a portion of the device which is shown in FIG. 1.
Figure 3:
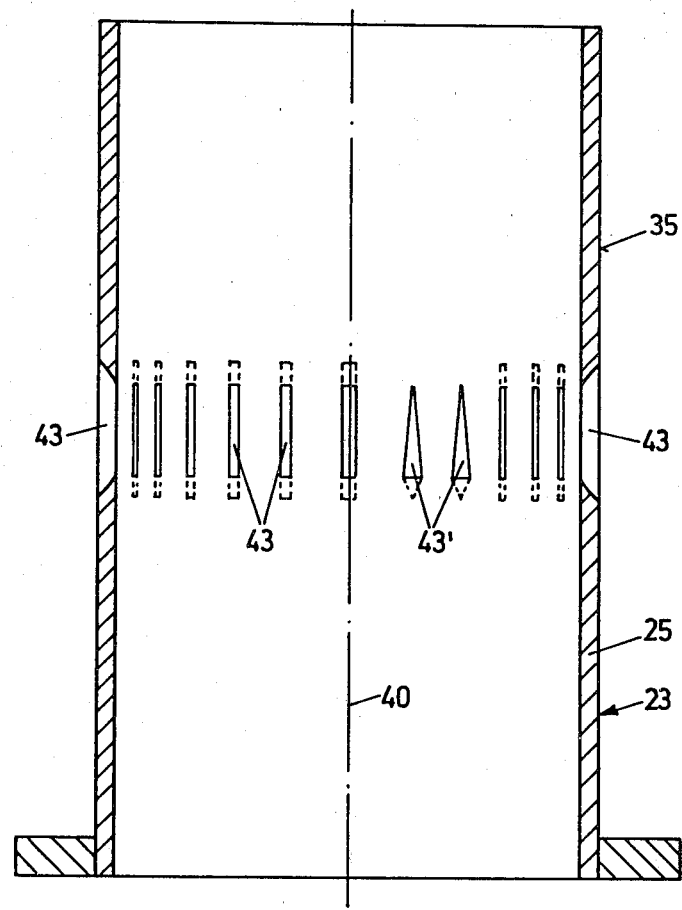
FIG. 3 shows a part of the device, shown in FIG. 2, provided with modified orifices.

In the embodiment, according to FIG. 3, the cylindrical section 25 of the feed branch 23 is not provided with several peripheral rows of bores but, instead, is provided at equal angular spacings on the periphery, with a multiplicity of slots 43, which extend parallel to the axis 40 and which can be cut, for example, by means of disc milling cutters, within the cylindrical tubular section 25. The shell 30, forming the ring passage 29, is placed over the outer wall 35 of this section 25 in the same way as in the embodiment, shown in FIG. 2. The slots 43 can be fully opened or closed to an infinitely variable extent; in particular the holes can be closed completely in the end stage, by axial displacement of the shell. The axial extent "d" of the slots is therefore smaller than the axial distance "c" described above.

Figure 4:
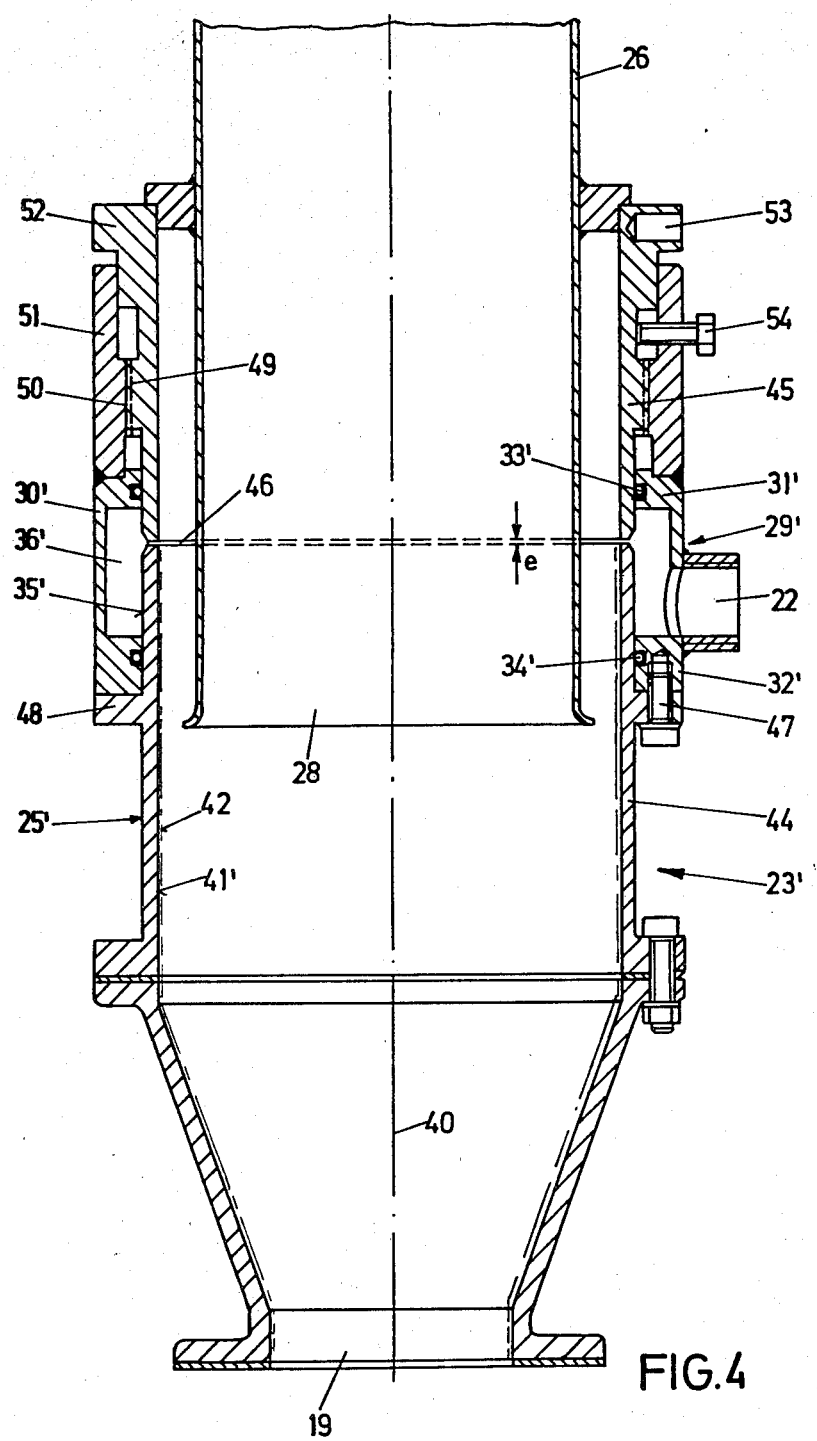
FIG. 4 shows a further embodiment of a device constructed according to the invention.

In the embodiment, according to FIG. 4, the cylindrical section 25' is divided above the exit orifice 28 of the solids-feeding device 26, so that an annular gap 46 is formed between the lower part section 44 and the upper part section 45. A shell 30', which encloses an annular space 36' and has a C-shaped cross-section, is in the form of a ring which is located on the outerwall 35' of the section 25', so that it overlaps the gap 46. On the one hand, the liquid-feed line 22 leads into the annular space 36' and, on the other hand, the annular gap 46 leads from this annular space 36' into the feed branch 23'. The two legs 31' and 32' of the shell 30' are sealed against the outer wall 35' by means of ring gaskets 33', 34'.

The shell 30' is screwed to the lower part section 44 of the cylindrical section 25' by means of screws 47, which are screwed into the lower leg 32 through a ring flange 48 located on the lower part section 44.

The upper part section 45 is displaceable relative to the lower part section 44, so that the axial width "e" of the gap 46 is adjustable. For this purpose, the upper part section 45 has on its outside a threaded section 49, which is associated with an internal thread section 50 in a sleeve 51, which is joined, secure against rotation, to the shell 30' and thus to the lower part section 44, for example by welding. In the upper flange 52 of the upper part section 45, one or more radial blind holes 53 are formed, into which a rod, a lever, or the like, can be inserted for rotating the upper part section 45 and hence adjusting the gap width. To prevent inadvertent adjustments of the gap width during operation, a clamping screw 54 is provided in the sleeve 51, by means of which clamping screw, the sleeve 51 and the upper part section 44 can be clamped together. In this case also, the liquid film 42 flows through the gap 46 and down the inner wall 41' of the feed branch 23' to the feed orifice 19.

It should also be added that, in the embodiments shown in FIGS. 2 and 3, the tangential distance of the orifices, which is that of the bores 37, 38 or 39, or of the slots 43, from one another is, in each case, between 5 and 15 mm so that, a few millimeters below these orifices, the liquid issuing from these orifices is combined to give an unbroken liquid film 42 of uniform thickness. To ensure that the liquid, which is to be fed, does not lift off in the manner of a jet when it passes through the particular orifices, but that it flows quietly through the orifices, so that it does not lift off the inner wall 41 or 41', it is fed to the annular space 36 or 36' substantially without any pressure.

Smoothing-out of the distribution of the liquid film 42 on the inner wall 41, can be achieved in the embodiment, shown in FIG. 2, by an arrangement in which the bores of the individual rows are mutually offset tangetially, as indicated in the left portion of FIG. 2. The liquid rate control, which is obtained by means of the bores 37, 38 and 39 of different diameter, can also be achieved in a similar manner in the embodiment, shown in FIG. 3, where slots 43' are provided, which widen towards the base in the manner of a wedge, as is shown as an alternative embodiment in FIG. 3. The remaining slots 43, shown in FIG. 3 have, over their full axial extent, the same opening width towards the inner wall 41.

It will be obvious to those skilled in the art that various changes may be made without departing from the scope of the invention and the invention is not to be considered limited to what is shown in the drawings and described in the specification.

What is claimed:

1. Device for the simultaneous and continuous feeding of pulverulent solids and of liquids into a treatment machine, having a feed orifice for solid and liquid materials the orifice being formed on the casing of the treatment machine and having a walled feed branch extending upwardly therefrom, a ring passage located above said orifice having aperture means for the feed of liquid material positioned on the inner wall of the feed branch and means for feeding the solid material located in the center of the ring passage, characterized in that the free cross-section of said aperture means is adjustable.

2. Device according to claim 1, characterized in that said ring passage is defined by a shell sealingly mounted in spaced relation on a section of the feed branch, said shell including a leg extending axially along said section, and means for axially displacing said shell on said section so that said leg is displaceable into and out of a position wherein said aperture means is covered.

3. Device according to claim 2, characterized in that aperture means comprises several annular rows of bores formed in said section.

4. Device according to claim 3, characterized in that the bores have different diameters in each of said rows.

5. Device according to claim 3, characterized in that the bores within one row are, in each case, arranged with an offset in tangential direction relative to the adjacent bores of the other rows.

6. Device according to claim 2, characterized in that said aperture means comprise axially extending slots which are formed in said section.

7. Device according to claim 6, characterized in that each said slot widens towards its base in the shape of a wedge.

8. Device according to claim 1, characterized in that the ring passage is formed by a shell sealingly mounted in spaced relation on a section of the feed branch having an annular gap, said shell covering said gap, and the axial width of said gap being adjustable.

9. Device according to claim 8, characterized in that said section of the feed branch comprises two parts, said shell being rigidly joined to one part of said section, and the other part of said section being axially adjustable relative to said shell.

10. Device according to claim 9, characterized in that means for adjusting the width of said gap is provided, said adjusting means comprising a threaded connection.

* * * * *